United States Patent [19]

Pitot et al.

[11] Patent Number: 5,375,142
[45] Date of Patent: Dec. 20, 1994

[54] METHOD AND DEVICE FOR DETECTING AND CHECKING THE TEMPLATE OF DIGITAL MESSAGES TRANSMITTED TO A RECEIVER DEVICE

[75] Inventors: Christian Pitot, Boulogne; Francoise Roussel, Sevres; Louis Vritz, Villebon s/Yvette, all of France

[73] Assignee: Sextant Avionique, Meudon la Foret, France

[21] Appl. No.: 872,384

[22] Filed: Apr. 23, 1992

[30] Foreign Application Priority Data

May 7, 1991 [FR] France ................. 91 05566

[51] Int. Cl.[5] .................................. H04B 3/46
[52] U.S. Cl. ........................... 375/10; 324/76.11
[58] Field of Search .............. 375/10; 371/3, 20.1;
370/17; 364/221.5, 221.6, 921.8, 556, 500;
455/226.1; 324/76 R, 78 D

[56] References Cited

U.S. PATENT DOCUMENTS

| 4,513,419 | 4/1985 | Small | 371/20.1 |
| 4,545,055 | 10/1985 | Patel | 375/55 X |
| 4,617,678 | 10/1986 | Devensky et al. | 375/102 |
| 4,663,766 | 5/1987 | Bremer | 375/13 |

FOREIGN PATENT DOCUMENTS 0338881  3/1989  European Pat. Off. .
2126849A 1/1983  United Kingdom .

*Primary Examiner*—Tesfaldet Bocure
*Attorney, Agent, or Firm*—Browdy and Neimark

[57] ABSTRACT

A method of detecting and checking the template of digital messages sent to a receiver device includes the encoding beforehand of templates definable by a limited number of parameters. The parameters are detected in the information being received. The stored template matching the parameters detected is determined. The conformity of the information received with the template detected is checked. If this check indicates that the information being received does not conform to the detected template the method returns to the detection step. The method is applicable in particular to receiving asynchronous digital transmissions where it is necessary to check that the information received conforms to one or more modulation templates.

17 Claims, 3 Drawing Sheets

METHOD AND DEVICE FOR DETECTING AND CHECKING THE TEMPLATE OF DIGITAL MESSAGES TRANSMITTED TO A RECEIVER DEVICE

BACKGROUND OF THE INVENTION

1. Field of the invention

The present invention concerns a method and device for detecting the speed of transmission and checking the template of digital messages transmitted to a receiver device over a transmission line.

It applies more particularly to receiving asynchronous digital transmissions when it is necessary to verify the information received conforms to one predefined modulation templates each specifying constraints to be applied to a number of transmission parameters, such as:

the duration of transmission of one information bit
the duty factor of the modulation signal;
the time interval or "Gap" between two words;
the number of bits per word; and
the parity of the word.

DESCRIPTION OF THE PRIOR ART

Templates of this kind are defined in standards such as the aeronautical standard ARINC 429, for example.

This standard provides two transmission speeds, a "low speed" of 12.5 kbit/s and a "high speed" of 100 kbit/s.

This means using receivers designed to enable either of these two values to be programmed, as appropriate to the nature of the information transmitted.

An object of the invention is not only to solve this problem but also to make it possible to receive other types of modulation not defined in the aforementioned standard without compromising the security of applications requiring conformity with the standards.

SUMMARY OF THE INVENTION

The invention consists in a method of checking the template of digital messages transmitted to a receiver device, comprising the following steps:

a first step of coding beforehand a particular number of possible templates definable by a limited number of parameters;
a second step of detecting said parameters in the information being received and determining which of the memorized templates matches the detected parameters;
a third step of checking that the information received conforms to the detected template;
returning to the second step if said checking indicates that the information being received does not conform to the detected template.

If it succeeds, the detection phase must have a duration just sufficient to allocate the template type information.

Of course, a method in accordance with the invention could further provide for the rejection of unreliable information, that is say information which during its transmission did not meet all of the constraints of a single template from all possible templates.

To the above checking process may be added a sorting sequence based on a selection criterion which is an integral part of the information transmitted and is preferably located at the start of the information transmitted, said sorting sequence comprising:

cyclical scanning at a fixed frequency of a programmed list of conditions stored in memory;
acquisition of information transmitted on the line
activation of a selection process each time that the information selection criterion has been acquired, the selection process including a synchronization stage which waits for the scanning process to cross the start of said list of conditions, a comparison (pattern matching) sequence on the selection contained in the information being received and the production of a selection variable which indicates the message being received is of interest to the receiver or not, the selection process ending either when all the conditions from said list have been exhausted and on returning to the start of list condition or upon reading a special end of list code;
memorization of the information selected in a buffer accessible to said local unit.

In another aspect, the present invention consists in a device for checking the template of digital messages transmitted to a receiver device in the form of a highly integrated input/output interface unit connected to a local processor and to at least one information receive channel via a demodulator, said interface unit comprising means for implementing the following steps a first step of coding beforehand a particular number of possible templates definable by a limited number of parameters;
a second step of detecting said parameters in the information being received and determining which of the memorized templates matches the detected parameters;
a third step of checking that the information received conforms to the detected template;
returning to the second step if said checking indicates that the information being received does not conform To the detected template.

The information on the receive channel advantageously conforms to the ARINC standards and comprises a succession of 32-bit words generated in accordance with the previously mentioned modulation templates and each comprising in succession:

a first number on eight bits (bits 0 through 7) defining a label;
a second number (SDI) on two bits (bits 8 and 9) identifying the source or the destination of the word;
a third number on 21 bits (bits 10 through 30) containing the transmitted data; and
a parity bit (bit 31).

One embodiment of this interface unit will now be described by way of non-limiting example with reference to the appended drawings.

DETAILED DESCRIPTION OF THE INVENTION

Figure 1:
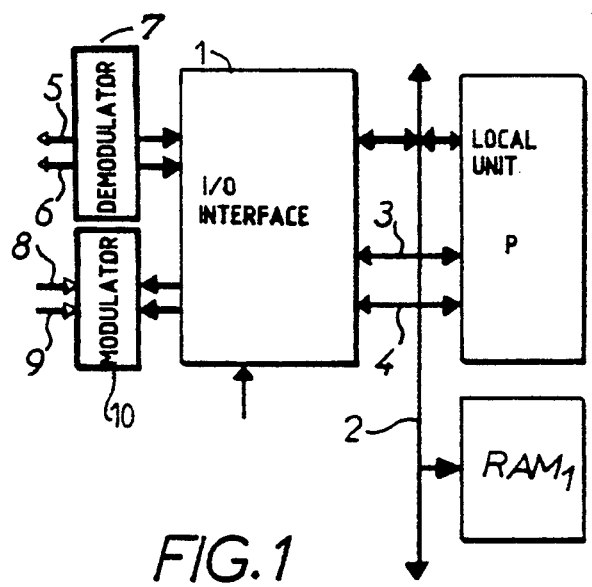
FIG. 1 is a block diagram showing how an interface in accordance with the invention is connected between a processor and two pairs of transmission channels (two send channels and two receive channels).
Figure 2:
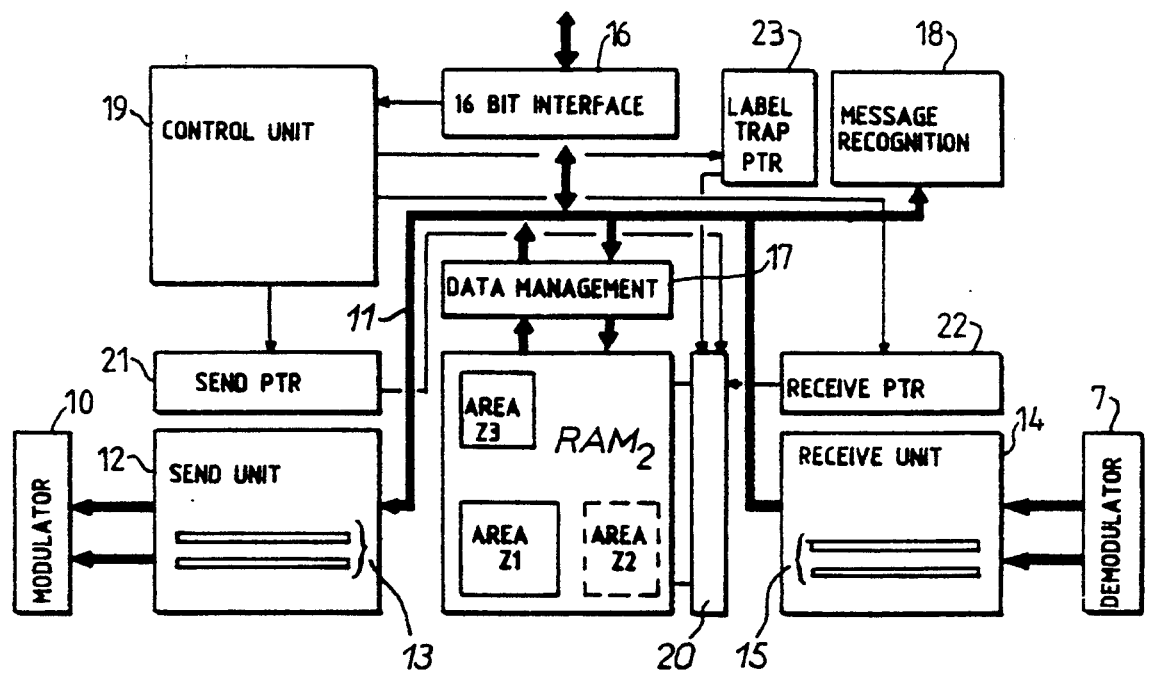
FIG. 2 is a block diagram of the interface shown in FIG. 1.

In the example shown in FIG. 1, an input/output interface 1 in accordance with the invention is connected to a microprocessor-based local unit P connected to a random access memory $RAM_1$ by a data bus 2, a control bus 3 and an address bus 4 and connected to two channels 5, 6 for receiving information conforming to the ARINC 429 standard via a demodulator 7 and to two channels 8, 9 for sending information conforming to the ARINC 429 standard via a line modulator 10.

The input/output interface 1 comprises, interconnected by an internal bus 11:

a send unit 12 connected to the modulator 10 and using a buffer comprising two 16-bit registers 13 to store the half-word being sent on each channel; the buffer may be an extension of a memory area $Z_1$ described later in which the words are organized in queues;

a receive unit 14 connected to the demodulator 7 and "using a buffer comprising two 16-bit registers 15 accumulate the bits of ARINC half-words received each of the two channels before they are transferred into a memory area $Z_2$ described later;

a 16-bit interface 16 connected to the microprocessor-based local unit P;

a random access memory $RAM_2$ associated with a data management circuit 17 and which may be an extension the two buffers 13, 15;

a pattern matching message recognition device looking for coincidence between the selection criteria of words being received on the two channels and label trap codes stored in an area $Z_3$ of the random access memory $RAM_2$, these codes being presented sequentially to the message recognition device by a label trap pointer 23; and a control unit 19 driving an address Generator 20 associated with the random access memory $RAM_2$ through a send pointer 21, a receive pointer 22 and the label trap pointer 23.

ARINC words can be sent over the two channels 8, 9 at programmable frequencies of 12.5, 100 and 1 000 kHz, for example.

The words to be sent are formatted and loaded by the processor P into a memory (for example, an area of the random access memory $RAM_2$). Parity and template generation, transmit sequencing and parallel-to-serial conversion are carried out internally for each channel.

The ARINC words to be sent are supplied by the processor P and stored in the memory area $Z_1$ of the random access memory $RAM_2$ before parallel-to-serial conversion.

The memory area $Z_1$ is managed like an FIFO stack using dynamic allocation in order to optimize its occupancy according to the speed programmed for each of the two channels 8, 9. Its capacity is 32 ARINC words for the combination of the two channels.

The loading of an ARINC word (32 bits) into the memory area $Z_1$ is initiated by the local unit and is carried out in two stages: transfer of the 16 least significant bits followed by the 16 most significant bits. The parallel-to-serial conversion of an ARINC word on a required channel 8, 9 can only proceed when:

its half-words have been loaded by the local unit (processor P) into the memory area $Z_1$;

all words previously sent to this channel have been sent in full.

The 32nd bit of the ARINC word which defines the parity of the word is calculated internally.

The transmission frequency is defined by a programming word sent by the local unit (processor P).

Transmission starts on one channel immediately a complete word has been loaded into a pair of 16-bit words with consecutive addresses allocated in area $Z_1$ to the channel in question by the dynamic allocator device included in the send pointer 21.

ARINC words are received over channels 5, 6 in the following manner:

Each word received having passed the checks requested in a programming word and having selection information (in this instance, the combination label-SDI-channel) identified by the message recognition device is loaded into memory after substituting for its 32nd bit (parity bit) the number of the channel on which it was receive. It is loaded into the area $Z_2$ of the random access memory $RAM_2$ managed as an FIFO stack with a capacity of 64 ARINC words.

The full restoral of an ARINC word stored in this way is initiated by the processor P and requires two consecutive read phases, namely:

a phase in which the 16 least significant bits are read;

a phase in which the 16 most significant bits are read.

When the memory area $Z_2$ is empty the two read operations initiated by the local unit restore a special code, for example the code 0000 h.

As already mentioned, before it can be transferred into the memory area $Z_2$ the word currently being received is subject to a number of checks of a kind which can be programmed in the programming word.

The problems which can cause the word to be rejected include, for example:

non-standard duty factor (its value is outside a predetermined range of values);

inconsistent speed (not all bits are received at the same speed);

non-standard speed;

"gap" error (the duration of the time interval preceding the start of the next word is less than a predetermined value);

simultaneous reception of a high logic state on the H and L pins of the same ARINC channel;

parity error (for example, the parity of a word is not odd after its 32 bits are received).

In this example each of the channels is of the two-wire type (H and L wires) and the modulators apply differential modulation.

Figure 3:
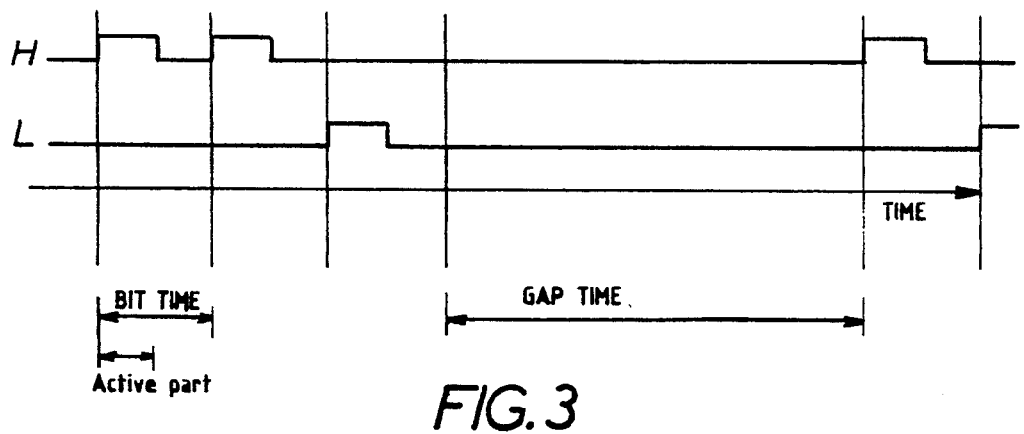
FIG. 3 is a timing diagram showing the signals sent on the send channels using "two-wire differential modulation" type encoding.

This type of modulation is shown in FIG. 3 which is a timing diagram showing the signals sent on the H and L wires representing the end of one ARINC word and the beginning of the next word after a time interval ("Gap") with no modulation.

The templates defined by the ARINC 429 standard for this type of modulation specify constraints or conditions that are met by the following parameters shown in FIG. 3 and associated with the corresponding constraint:

"bit time": the minimum and maximum duration of transmission of one information bit, modulation duty factor: equivalent to the minimum an maximum duration of the transmission of the active part of one bit, minimum "Gap" time: Minimum time interval with no modulation separating at least two bit streams constituting a word, the number of bits per word, the parity of a word.

Figure 4:
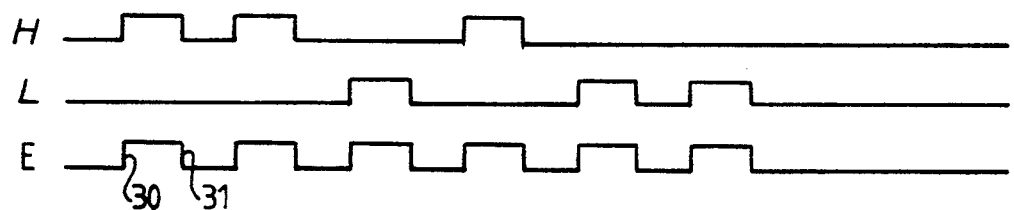
FIG. 4 is a timing diagram showing the envelope of signals of the type shown FIG. 3.

The invention uses the modulation envelope to check the templates. The modulation envelope is a signal E obtained by applying the "OR" operator to the signals sent on the H and L wires (see FIG. 4).

Figure 5:
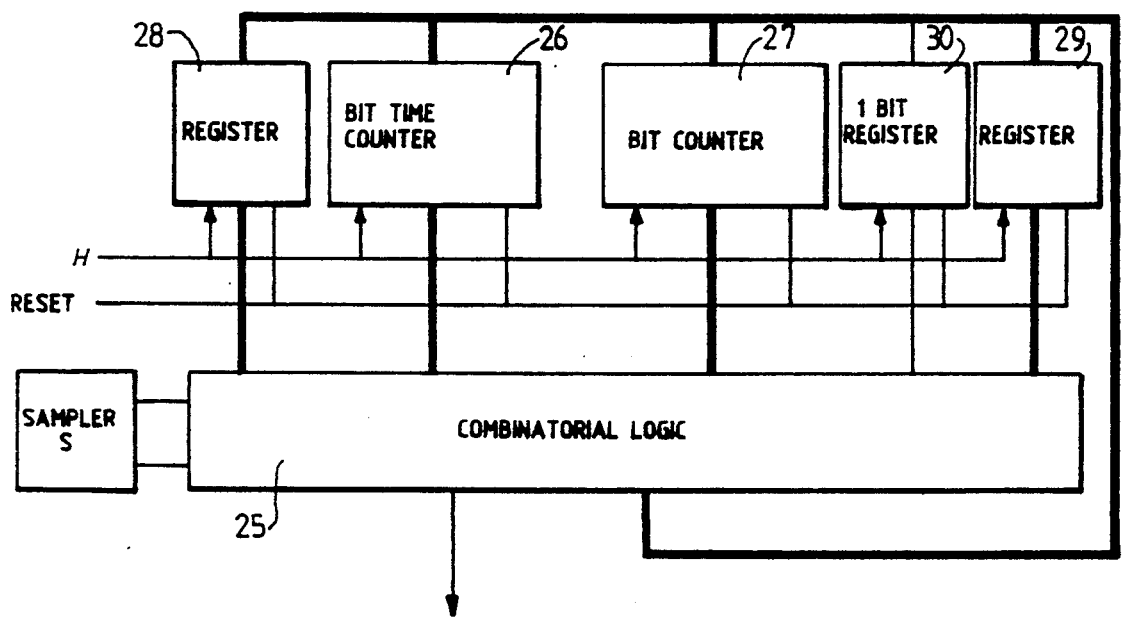
FIG. 5 is a block diagram of the receive unit of the interface shown in FIG. 2 (for one channel).

Referring to FIG. 5, the template checking device used by the receive unit comprises a sampler S which samples the envelope, i.e. it reads and stores the value of the envelope at a sampling period that is very short relative to the bit period.

These samples naturally have the successive values 0 and 1 according to whether the envelope has the value 0 or 1 at the relevant time. An "event" occurs each time that the value of a sample differs from the value of the previous sample on the same channel. There are two types of event:

a) a "rising edge 30" which is a succession of two samples having the values 0 then 1, b) a "falling edge 31" which is a succession of two samples having the values 1 then 0.

A combinatorial logic circuit 25 uses the samples from the sampler to update a counting system comprising two counters:

a bit time counter 26 whose capacity is at least equal to the maximum number of samples likely to be counted between the rising edge of the last bit of one word transmitted at the speed representing the slowest template and the time at the end of which a minimum "Gap" has elapsed, and a bit counter 27 whose capacity is at least equal the length of the word, this counter being adapted count rising or falling edges of the envelope from the start of a word, for example.

During the reception of a word the logic circuit 25 establishes for each sample from the sampler a "context" for the channel being received comprising:

the value of the previous sample (one bit), stored in a register 28, the reading of the bit time counter 26, the reading of the bit counter 27, the code of the detected template stored in a register 29 comprising sufficient bits to contain all template codes likely to be received, the current parity (in a 1-bit register 30), the "Gap detected" indication contained in a register and supplied by a "Gap" detector which may comprise a system for decoding the "0" value of the bit counter 27.

The bit time counter 26 and the bit counter 27 are advantageously connected in series to achieve the dynamics needed to count the "Gap" when the last bit of the word has been received.

Initially, the counters 26 and 27 are at zero, the previous sample stored in the register 28 has the value 0, the template code in register 29 is immaterial (it could be made up of bits at 0, for example, provided that this value does not represent the code of any template), the parity in register 30 is at 0 and the "Gap detected" bit is at 1.

From this initial state, which can be brought about by resetting the interface, the context evolves as each sample is produced, subject to the following rules:

1) If the bit counter 27 is at 0 (the "Gap detected" bit being at 1), the context can only change on a "rising edge" type event. In this case, the event bring about:

1. incrementing of the bit counter 27,
2. resetting (by default) of the sample counter,
3. initialization of the current parity with the 0 or 1 value of the bit being received.

If no event occurs or if the event is a falling edge, action is taken.

2) If the bit counter 27 is at 1:

Each sample (except in the case where a "rising edge" type event occurs) causes the bit time counter 26 to be incremented.

If a "rising edge" type event occurs, the system:

detects the template code on the basis of the value of the bit time counter 26 and stores this code in the template code register 29, increments the bit counter 27, resets the bit time counter 26, updates the parity.

This reset terminates the template detection and memorization phase in respect of the information being received.

3) If the bit counter 27 indicates a digit between 1 and the value of the number of bits expected for a word exclusive:

each sample causes the bit time counter 26 to be incremented (except in the case of a "rising edge" type event).

if a "falling edge" type event occurs:

the system checks the current value of the bit time counter 26 relative to the minimum and maximum limits of the bit active part duration:

if the current value is between the aforementioned limits the system does not take any particular action if the current value is outside the aforementioned limits the system produces an error signal.

A "rising edge" event bring s about:

incrementing of the bit counter 27;

checking of the current value of the bit time counter 26 against the minimum and maximum limits of the bit time (as appropriate to the active template code):

if the current value is within the limits no particular action is taken;

if the current value is outside the limits an error signal is produced;

resetting of the bit time counter 26;

updating of the parity.

4) If the bit counter 27 indicates a digit representing the value of the number of bits expected for a word, all events except a "rising edge" event bring about:

checking of the parity:

if the parity is correct no particular action is taken;

if the parity is incorrect an error signal is produced;

a wait for the minimum "Gap" value for the template type detected:

if the bit time counter 26 detects a value different than the minimum "Gap" value the system takes no particular action;

if the bit time counter 26 detects a value equal to the minimum "Gap" value the system outputs a "correct end of word" signal;

incrementing of the bit time counter 26.

If a "falling edge" type event occurs, it further causes the current value of the bit time counter 26 to be checked against the minimum and maximum limits of the active part duration:

if the current value is within the limits no particular action is taken, if the current value is outside the limits the system outputs an error signal.

5) Other checks relating to the template are carried out in parallel:

if the bit counter 27 indicates a value other than the system checks that it has never reached a maximum value exceeding the minimum "Gap" time detected, when the maximum value representing the bit active time duration is reached the system checks that the current sample value is 0, if either of these two conditions is not met, the system produces an error signal which is also produced if the signals on the H and L lines are both at 1 during any sampling period.

In all cases, the error signal brings about:
updating of the error vector (if any),
resetting of the bit counter 27 ("Gap detected" bit at 1),
resetting of the sample (bit time) counter 26,
resetting of the parity.

The "correct end of word" signal brings about:
resetting of the bit counter 27 ("Gap detected" bit at 1),
resetting of the sample (bit time) counter 26,
resetting of the parity,
sending to the devices on the output side of a signal indicating that a correct word is available (output 31).

Figure 6:
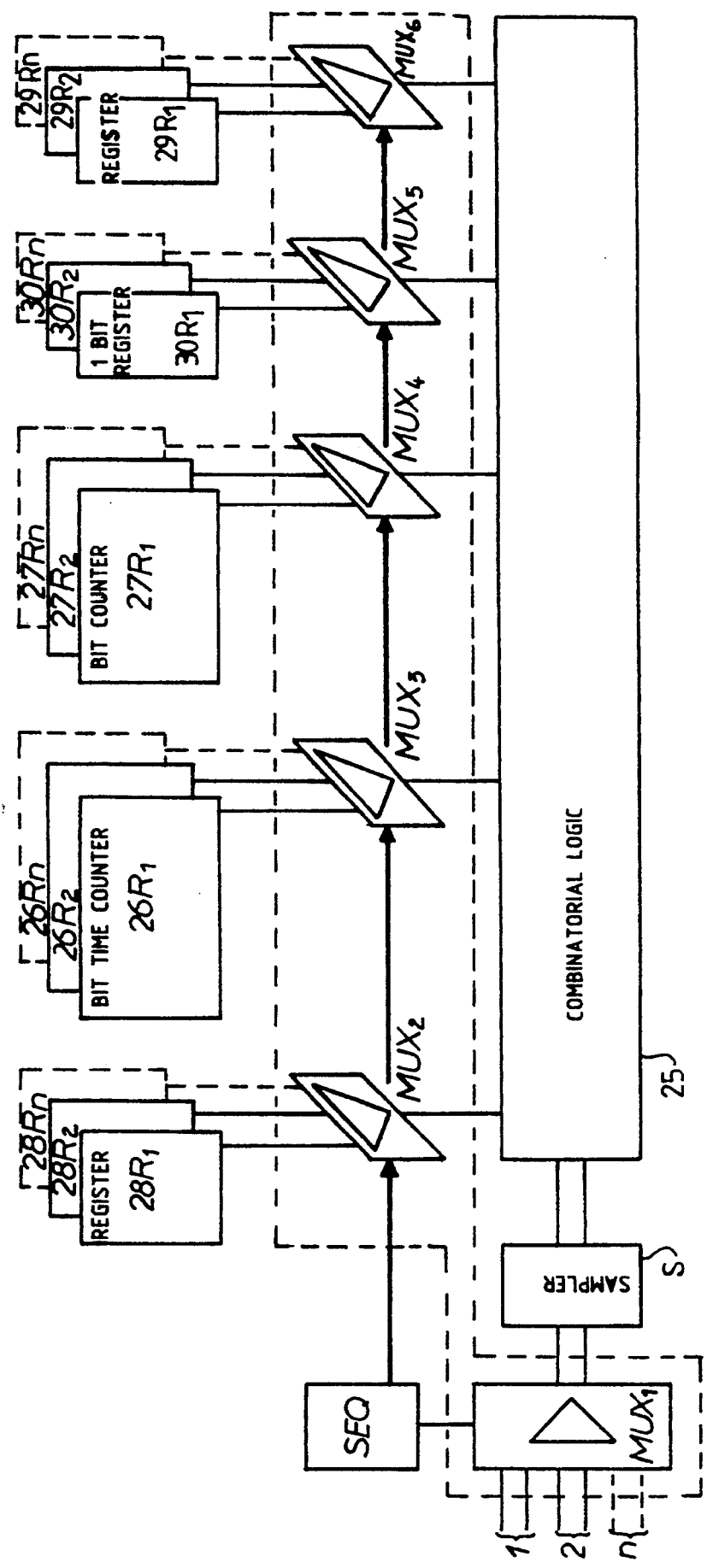
FIG. 6 is a block diagram showing how n channels can be generated from FIG. 5.

As previously mentioned, the device shown in FIG. 5 can be generalized to channels in the manner shown in FIG. 6. In this example, the transmission channels are sequentially connected to the input of the sampler S by a multiplexer $MUX_1$ driven by a sequencer SEQ.

The device uses five sets of registers:

a first set of n bit time counters $26 R_1, 26 R_2, \ldots, 26 R_n$, a second set of n bit counters $27 R_1, 27 R_2, \ldots, 27 R_n$, a third set of n registers for storing the value of the previous sample $28 R_1, 28 R_2, \ldots, 28 R_n$, a fourth set of n registers for storing the template code $29 R_1, 29 R_2, \ldots, 29 R_n$, and a fifth set of n current parity registers $30 R_1, 30 R_2, \ldots, 30 R_n$.

Each of these five sets of registers is connected to the logic circuit 25 by a respective multiplexer $MUX_2$ through $MUX_6$ driven by the sequencer SEQ synchronously with the multiplexer $MUX_1$.

This solution has the advantage of using only a single combinatorial logic circuit and a sing le sampler S, the multiplexers $MUX_1$ through $MUX_6$ possibly being part of a common multiplexing system. Note that the combinatorial part of the counters 26 and 27 may advantageously be incorporated in the combinatorial logic 25, so that it does not need to be duplicated times.

The device for recognizing the selection information contained in the messages has two separate functions:

1) It selects the ARINC words to be receive in the memory area $Z_2$ (using the information contained in the respective label-SDI-channel combination).

2) It sends interrupts to the local unit (processor P) if ARINC words are received containing "special" label-SDI-channel combinations.

These two functions are carried out by sequentially comparing the label-SDI-channel combination of each new word received with all the codes stored in an internal table called the label trap.

This table is physically implemented by an area $Z_3$ of the random access memory $RAM_2$ which can have a storage capacity of 64 words × 16 bits, for example.

It must be preloaded sequentially by the local unit (processor P) before the interface 1 is initialized in the mode then present provided for this purpose.

The process of scanning the codes in the table takes 128 basic clock periods of the circuit, for example, and reads the 64 entries of the list successively. It is activated automatically on receiving the 10th bit of the ARINC word currently being received. The selection process is synchronized when the list pointer passes through the zero address of the list of conditions which synchronizes the selection task and the label trap scanning task.

The label-SDI-channel combination of a word newly received is regarded as identical with one of the label traps programmed by the local unit if the following three conditions are met:

1) The labels received and programmed are identical or differ only in respect of bits for which a mask has been defined.

2) The SDI received and programmed are identical or subject to masking.

3) The channel numbers received and programmed are identical or subject to masking.

The function of the recognition device previously described is to generate a selection variable determining whether the word is retained or rejected.

When the condition list scanning process is synchronized, the selection variable is naturally at zero. Starting from this point, each time a new condition is read from the list and until the list is exhausted (or an end of list word is read), the value of the selection variable is modified in accordance with the rules explained below which depend on the nature of the codes employed.

In this example the local unit can define three different types of code:
bases,
base alterations,
end of list word.

A base is a 16-bit binary word in which:
bits 0 through 7 represent the programmed label which is compared with the received label;
bits 8 and 9 represent the programmed SDI which is compared with the received SDI;
bit 10 represents the programmed channel number which is compared with the received channel number;
bit 11 characterizes the fact that the current code is a base;
bit 12 can be used to mask the SDI comparison;
bit 13 can be used to mask the channel number comparison;
if identity with the current code has been established, bit 14 can be used to cancel the effect of previously established identity with another code reversal);
bit 15 can be used to identify the label-SDI-channel combination associated with the ARINC word being received as "special" if the current code succeeds in establishing identity.

A base alteration is a 16-bit binary word in which:
bits 0 through 7 which represent the label can be used to mask the comparison between some label bits and the same-position bits in the altered base;
bits 8 through 10 must be forced to 0;
bit 11 characterizes the fact that the current code a base alteration (the characteristics of the base with which the alteration is associated being retained);
bits 12 through 15 must be forced to 0.

The end of list word is a 16-bit binary word which can be used to specify the end of the label trap table when the latter does not need to be programmed in its entirety.

Codes following this end of list word are therefore prevented from contributing to the analysis of whether the label-SDI-channel combination is identical to the ARINC word being received. Its characteristic value FF00 h, for example (first eight bits at 1, last eight bits at 0). The following examples will illustrate more clearly the principle of the programming carried out by the programming codes from the table, whether this concerns a base, a base alteration or an end of list word.

EXAMPLE No 1

| | | |
|---|---|---|
| 0 0 000 0 01 00001111 | → Label word recognition | |
| | with the SDI | 00001111 |
| | on the channel | 01 |
| 0 0 000 1 10 11110000 | → and label words | 0 |
| | | 11110000 |
| | with the SDI | 10 |
| | on the channel | 1 |
| 1 1 111 1 11 00000000 | → End of list | |

EXAMPLE No 2

| | | |
|---|---|---|
| 0 0 110 x xx 10101010 | | |
| 0 0 001 0 00 00001111 | | |
| 0 0 001 0 00 10000000 | → Label word recognition | |
| | | 1010xxxx |
| | | & x0101010 |
| | with the SDI | 00,01, |
| | | 10 & 11 |
| | on the channels | 0 & 1 |
| 0 1 000 1 11 10101100 | | |
| 0 0 001 0 00 00001100 | | |
| 0 0 001 0 00 00000011 | → except label words | |
| | | 1010xx00 |
| | | & 101011xx |
| | with the SDI | 11 |
| | on the channel | 1 |
| 1 1 111 1 11 00000000 | → End of list | |

EXAMPLE No 3

| | | |
|---|---|---|
| 1 0 000 0 00 00000000 | | |
| 0 0 001 0 00 11111110 | → Label word recognition | |
| | | xxxxxxx0 |
| | with the SDI | 00 |
| | on the channel | 0 |
| & Sending of an interrupt to the local unit | | |
| 1 1 111 1 11 00000000 | → End of list | |

Bearing in mind what has been explained above, the value of the selection variable is determined by applying the following rules:

a) If the condition is a base and the channel/SDI/label values which characterize the word being received coincide with the base code:

If the condition reversal bit has the value 0, the selection variable is set to 1.
If the condition reversal bit has the value 1, the selection variable is set to 0.
In other cases the selection variable is unchanged.

b) If the condition is a base alteration and the channel/SDI/label values which characterize the word being received coincide with the code of the previous base received modified in the sense of widening the condition by means of immaterial positions introduced by the current base alteration:

If the condition reversal bit has the value 0, the selection variable is set to 1.
If the condition reversal bit has the value 1, the selection variable is set to 0.

c) If the condition is an end of list word:
The value of the selection variable is the definitive value.

As previously mentioned, the sequence of checks applied to the ARINC words being received is programmed (by the programming word) and produces a 16-bit status word which tells the local unit the state of the interface and the characteristics of the transmissions carried out. In this 16-bit status word:

bits 0 and 1 denote the speed at which the ARINC words are transmitted on the first channel (there are three possible speeds);
bits 2 and 3 denote the speed at which ARINC words are transmitted on the second channel;
bits 4 and 5 define the operating mode:
00 - application,
01 - label trap,
10 - receive RAM test,
11 - send RAM test;
bits 6 through 9 are interrupt enabling bits for use when:
the send FIFO stack becomes empty (bit 6),
the receive FIFO stack becomes empty (bit 7),
the send FIFO stack overflows (bit 8),
the receive FIFO stack overflows (bit 9).

If a problem for which checking is programmed in the programming word is detected on either of the two channels the status word is updated by adding a flag characterizing the problem.

On a reset all receive checks are disabled (bits 10 through 15), all interrupts requested by the FIFO stacks are disabled (bits 6 through 9), the operating mode set to "label trap" (bits 4 and 5) and transmission is inhibited on both channels (bits 32 and 10 equal to 0).

Interrupts are managed by an interrupt vector which the local unit reads when it receives an interrupt to determine the reason for the interrupt.

The interrupt vector is a 16-bit word in which:
bits 15 through 9 define the number of ARINC words stored in the receive FIFO stack:

| | |
|---|---|
| 0000000 | → 0 word |
| 0000001 | → 1 word |
| 0111111 | → 63 words |
| 1000000 | → 64 words |
| 1111111 | → overflow causing an interrupt to be sent; | bits 8 through 3 define the number of ARINC words stored i the send FIFO stack:

| | |
|---|---|
| 0000000 | → 0 word |
| 0000001 | → 1 word |
| 0111111 | → 31 words |
| 1000000 | → 32 words |
| 1111111 | → overflow causing an interrupt to be sent; | bit 2 indicates an interrupt following reception of a word whose label contains a flag;

bit 1 indicates an interrupt following a receive problem on one channel;

bit 0 indicates an interrupt following a receive problem on the other channel.

Communications between the processor of the local unit (called the CPU hereinafter) and the interface conform to a protocol defined by the following programming elements:

READING OF LABEL TRAP RAM BY CPU

CPU reads an interface port
Initiate access to label trap RAM (RAMCPUP)
Write label trap in RAM at address PTRLAB (label trap pointer)
Restore label trap to CPU
Increment label trap pointer PTRLAB
Send acknowledge signal to CPU
Quit RAMCPUP access

WRITING OF LABEL TRAP RAM BY CPU

CPU writes an interface port
Initiate local unit access to label trap RAM (RAMCPUP)
Write label trap sent by CPU in RAM at address PTRLAB
Increment label trap pointer PTRLAB
Send acknowledge signal to CPU
Quit RAMCPUP access

READING OF RECEIVE RAM BY CPU

CPU reads interface H/L port
Initiate RAMCPUR access (to receive RAM from local unit)
"Case" (present weight) of
  L : "Case" (previous weight) of
    H : If ("Flag" FIFOVIDER active)
    Then restore special FIFO empty code to CPU
    If not, read in RAM weight L of word present at address PTRLECR-0
      Restore this ½ word to CPU
    Endif
    Previous weight = L
    Memorise FIFOVIDER flag
    Send acknowledge signal to CPU
    L : NOP
  Endcase
H : "Case" (previous weight) of
  H : NOP
  L : If (FIFOVIDER flag active)
    Then restore FIFO empty code to CPU
    If not, read in RAM weight H of word present at address PTRLECR-1
      Restore this ½ word to CPU
      Increment read pointer PTRLECR
      If (PTRLECR = PTRECRR)
      Then activate FIFOVIDER flag
      Endif
    Endif
    Previous weight = H
    Free FIFOVIDER flag
    Send acknowledge signal to CPU
  Endcase
Endcase
Quit RAMCPUR access

WRITING OF RECEIVE RAM BY CPU

CPU writes interface H/L port
Initiate CPURAMR access
"Case" (present weight) of
  L : "Case" (previous weight) of
    H : If (FIFOPLEINR flag not active)
    Then write ½ word L sent by CPU in RAM at address PTRECRR-0
    Endif
    Previous weight = L
    Store FIFOPLEINR flag
    Send acknowledge signal to CPU
    L : NOP
  Endcase
H : "Case" (previous weight) of
  H : NOP
  L : If (FIFOPLEINR flag not active)
    Then write ½ word H sent by CPU in RAM at address PTRECRR-1
      Increment write pointer PTRECRR
      If (PTRECRR = PTRLECR)
      Then activate FIFOPLEINR flag
      Endif
    If not, receive FIFO overflow
    Endif
    Previous weight = H
    Free FIFOPLEINR flag
    Send acknowledge signal to CPU
  Endcase
Endcase
Quit CPURAMR access

READING OF SEND RAM BY CPU

CPU reads H/L port of interface channel X (X = 0/1)
Initiate RAMCPUT access
"Case" (present weight) of
  L : "Case" (previous weight on channel X) of
    H : If (FIFOVIDEXT flag of channel X active)
    Then restore special FIFO empty code in CPU
    If not, look for first occupied entry in channel X descriptor,
      from old read pointer PTRLECXT of channel X
    Store its address in read pointer PTRLECXT of channel X
    Read in RAM weight L of word present at address PTRLECXT-0
    Restore this ½ word to CPU
    Endif
    Previous weight on channel X = L
    Store FIFOVIDEXT flag of channel X
    Send acknowledge signal to CPU
    L : NOP
  Endcase
H : "Case" (previous weight on channel X) of
  H : NOP
  L : If (channel X FIFOVIDEXT flag active)
    Then restore special FIFO empty code to CPU
    If not read in RAM weight H of word present at address PTRLECXT-1
      Restore this ½ word to CPU
      Deactivate bit No PTRLECXT in channel X descriptor
      If (channel X descriptor empty)
      Then activate FIFOVEDEXT flag of channel X
      Endif
      Decrement count of words waiting in send RAM
    Endif
    Previous weight on channel X = H
    Free channel X FIFOVIDEXT flag
    Send acknowledge signal to CPU
  Endcase
Endcase -continued Quit RAMCPUT access

WRITING OF SEND RAM BY CPU

```
CPU writes H/L port of interface channel X (X = 0/1)
Initiate CPURAMT access
"Case" (present weight) of
    L : "Case" (previous weight) of
        H : If (FIFOPLEINT flag not active)
            Then look for first empty entry in descriptors of
            both channels,
                from old write pointer PTRECRT
                Store its address in write pointer PTRECRT
                Write ½ word sent by CPU in RAM at address
                PTRECRT-0
            Endif
            Previous access = L
            Previous channel = X
            Store FIFOPLEINT flag
            Send acknowledge signal to CPU
        L : NOP
    H : "Case" (previous weight. previous channel) of
        H : NOP
        L./X : NOP
        L.X : If (FIFOPLEINT flag not active)
            Then write ½ word sent by CPU in RAM at address
            PTRECRT-1
                Activate bit number PTRECRT in channel X
                descriptor
                Increment count of words waiting in send RAM
                If (counter full)
                    Then activate FIFOPLEINT flag
                Endif
                If not send FIFO overflow
                Endif
                Previous access = H
                Free FIFOPLEINT flag
                Send acknowledge signal to CPU
        Endcase
Endcase
Quit CPURAMT access
```

There is claimed:

1. A method of checking the modulation template of digital messages each comprising at least one word formed by a succession of information bits and transmitted on at least one information transmission channel to a receiver device by modulation of a signal according to a set of transmission parameters comprising a number of information bits per word, a duration of transmission of one information bit, a modulation duty factor, a time interval between two words called "Gap", and a parity of the word, said modulation template comprising constraints which must be met respectively by said transmission parameters, said method comprising the following steps:

a first step of memorizing in said receiver device a particular number of modulation templates, each being referenced by a respective code and defined by respective values of said constraints;

a second step of receiving a digital message and of determining the respective values of said transmission parameters according to which said received digital message is transmitted;

a third step of detecting one of said memorized modulation templates for which the value of at least one predetermined parameter of said transmission parameters values of said received digital message meets the corresponding constraint of said modulation template, and of checking whether all other of said transmission parameters values of said received digital message meet the respective constraints of said detected modulation template;

returning to the second step if none of said memorized modulation templates is detected.

2. Method according to claim 1 wherein said predetermined parameter is the duration of transmission of one information bit and is determined upon reception of the first information bit of said received digital message, the constraint corresponding to this transmission parameter defining the minimum and maximum durations of transmission of one information bit, and wherein if one of said memorized modulation templates is detected, the detection step lasts just sufficient time to allocate the code of said detected modulation template.

3. Method according to claim 1 further comprising the rejection of said digital message if throughout its receiving it has not met all the constraints of said detected modulation template.

4. Method according to claim 1 further comprising a selecting sequence based on a selection criterion, this selecting criterion being an integral part of the information contained in said digital message and is preferably located at the start thereof, said selecting sequence comprising:

cyclical scanning at a fixed frequency of a list of conditions stored in memory;

acquisition of said digital message transmitted on said transmitting channel;

activation of a selection process each time that the selection criterion has been acquired, the selection process including a synchronization stage which waits for the scanning process to cross the start of said list of conditions, a comparison (pattern matching) sequence on the selection information contained in said digital message, and the production of a selection variable which indicates if the digital message being received is of interest to the receiver device or not, the selection process ending either when all the conditions from said list of conditions have been exhausted and on returning to the start thereof or upon reading a special end of list code indicating the end of said list of conditions is reached;

memorization of the digital message selected in a buffer accessible to a local unit.

5. Method according to claim 1 wherein the digital message is generated by differential modulators and is sent asynchronously over two-wire channels and the modulation template is checked on a modulation envelope of said digital message.

6. Method according to claim 5 comprising:
sampling the envelope,
counting the samples contained in a bit of information,
counting the bits constituting a word, and wherein during the reception of a word a "context" is established for each sample comprising:
a value of the previous sample, previously memorized,
a value of a bit time counter,
a value of a bit counter,
a value of the detected modulation template code,
a value of the current parity,
a "Gap detected" indication.

7. Method according to claim 6 wherein after resetting for each sample the context can evolve only on a "rising edge" type event occurring when the previous sample and the current sample are respectively equal to 0 and 1, said "rising edge" type event bringing about incrementing of the bit counter, resetting of the sample counter and updating of the current parity, no action being effected when no event or following a "falling edge" type event occurring when the previous sample and the current sample are respectively equal to 1 and 0.

8. Method according to claim 6 wherein if said bit counter is at 1 and in the absence of a "rising edge" type event, each sample causes the bit time counter to be incremented and if a "rising edge" type event occurs it brings about:
   detection of the modulation template code from the bit time counter and storage of said code in memory,
   incrementing of said bit counter,
   resetting of said bit time counter,
   updating of the parity.

9. Method according to claim 6 wherein, when said bit counter indicates a value greater or equal to 1 and lower than the value of the number of bits expected for a word defined by the detected modulation template, the bit time counter is incremented at each sample between two successive "rising edge" type events, a "falling edge" type event causes checking whether the current value of the bit time counter meets the constraint concerning the modulation duty factor specified by said detected modulation template and the generation of an error signal if this constraint is not met, and when a "rising edge" type event occurs it brings about:
   incrementing of said bit counter,
   checking whether the current value of said bit time counter meets the constraint concerning the duration of transmission of one information bit specified by said detected modulation template and sending of an error signal if this constraint is not met,
   resetting of said bit time counter,
   updating of the parity.

10. Method according to claim 6 wherein, when said bit counter indicates a value equal to the value of the number of bits expected for a word, all events except "rising edge" type events bring about:
   checking whether the parity meets the constraint concerning the parity specified by said detected modulation template and sending of an error signal if the parity is incorrect,
   a wait for the expected "Gap" minimum value specified by said detected modulation template and the sending of a correct end of word signal if said bit time counter indicates a value equal to said minimum "Gap" value,
   incrementing of said bit time counter, and a "falling edge" type of event further causes checking whether the current value of said bit time counter meets the constraint concerning the modulation duty factor provided by said detected modulation template and the production of an error signal if this constraint is not met.

11. Method according to claim 10 wherein said error signal causes:
   updating of an error vector,
   resetting of said bit counter,
   resetting of said bit time counter,
   resetting of the parity.

12. Method according to claim 10 wherein said correct end of word signal brings about:
   resetting of said bit counter,
   resetting of said sample counter,
   resetting of the parity,
   sending to said local unit of a signal indicating that a correct word is available.

13. Device for checking the modulation template of digital messages each comprising at least one word formed by a succession of information bits and transmitted by modulation of a signal according to a set of transmission parameters comprising a number of bits per word, a duration of transmission of one information bit, a modulation duty factor, a time interval between two words called "Gap", and a parity of the word, to a receiver device in the form of an input/output interface unit connected to a local processor and to at least one information transmission channel via a demodulator, said modulation template comprising constraints which must be met respectively by said transmission parameters, said interface unit comprising a plurality of means for implementing the following steps:
   a first step of memorizing in said receiver device a particular number of modulation templates, each being referenced by a respective code and defined by respective values of said constraints;
   a second step of receiving a digital message and of determining the respective values of said transmission parameters according to which said received digital message is transmitted;
   a third step of detecting one of said memorized modulation templates for which the value of at least one predetermined parameter of said transmission parameters values of said received digital message meets the corresponding constraint of said modulation template, and of checking whether all other of said transmission parameters values of said received digital message meet the respective constraints of said detected modulation template;
   returning to the second step if none of said memorized modulation templates is detected.

14. Device according to claim 13 wherein said interface unit comprises, interconnected by an internal bus:
   a receive unit connected to said transmission channel by said demodulator and comprising a buffer;
   an interface to said local processor;
   a data management circuit coupled with a random access memory;
said interface unit further comprising a control unit connected to an address generator coupled with said random access memory through a receive pointer, a send pointer and a condition list pointer.

15. Device according to claim 14 wherein said receive unit comprises a combinatorial logic circuit having
   an OR logic circuit adapted to produce an envelope signal of the modulated signal set on the transmission channel which have two send wires, a detector adapted to detect the modulation template which is met by all the transmission parameters of said transmitted word and, a register for storing all modulation template codes of the words likely to be received, said combinatorial logic circuit being connected to:
   a sampler adapted to sample said envelope signal,
   a bit time counter having a capacity at least equal to the maximum number of samples likely to be counted between the rising edge of the last bit of one word transmitted at a speed equal to a value of a slowest transmission speed provided by said memorized modulation template and the time at the end of which a minimum "Gap" has elapsed, a bit counter having a capacity at least equal to the word length and adapted to count, rising or falling edges of the envelope signal from the start of a word, a register for storing a previous sample, a 1-bit parity register, and a register for storing a "Gap detected" indication supplied by a "Gap" detector.

16. Device according to claim 15 constituting an interface between said local processor and n transmission channels sequentially connected to the input of said sampler by a first multiplexer driven by a sequencer and five sets of registers:

a first set of n bit time counters, a second set of n bit counters, a third set of n registers for storing the value of the previous sample, a fourth set of n registers for storing the template code, and a fifth set of n current parity registers, and each of said five sets of registers is connected to said combinatorial logic circuit by a respective multiplexer driven by said sequencer synchronously with said first multiplexer.

17. Device according to claim 16 wherein said multiplexers are part of a common multiplexing system.

* * * * *